United States Patent [19]

Campau

[11] Patent Number: 4,819,577
[45] Date of Patent: Apr. 11, 1989

[54] FLUID FLOW INDICATOR

[75] Inventor: Daniel N. Campau, Grand Rapids, Mich.

[73] Assignee: Flow-Rite Controls, Ltd., Grand Rapids, Mich.

[21] Appl. No.: 196,421

[22] Filed: May 20, 1988

[51] Int. Cl.⁴ .............................................. G01F 15/00
[52] U.S. Cl. ..................................... 116/264; 116/273
[58] Field of Search ............... 116/264, 265, 266, 267, 116/268, 269, 270, 271, 272, 273, 274, 275, 276; 137/255, 262, 551, 557; 73/188, 861, 861.32, 861.35

[56] References Cited

U.S. PATENT DOCUMENTS

| | | | |
|---|---|---|---|
| 2,827,008 | 3/1958 | Hodge | 116/273 |
| 2,847,969 | 8/1958 | Woodruff | 116/273 |
| 2,970,561 | 4/1961 | Ashwood | 116/273 |
| 3,861,210 | 1/1975 | Grivens | 73/861.32 |
| 4,089,220 | 5/1978 | Houlberg | 73/861.32 |
| 4,271,704 | 6/1981 | Peters | 116/264 |
| 4,599,047 | 7/1986 | Nowlin et al. | 116/273 |

Primary Examiner—William A. Cuchlinski, Jr.
Assistant Examiner—Petar Arsenovic
Attorney, Agent, or Firm—Niro, Scavone, Haller, Niro & Rockey, Ltd.

[57] ABSTRACT

An inexpensive fluid flow indicator capable of use in low flow conditions in a variety of environments, including but not limited to laboratory, industry, and medical applications. Flows are visually indicated by the rotation of balls loosely retained in a longitudinal passageway of the indicator's transparent housing by a flow guide and an outlet port. The flow guide imparts a circumferential or transverse direction to the axial flow of the fluid which causes the balls to revolve about the center line of the indicator.

6 Claims, 1 Drawing Sheet 4,819,577

FLUID FLOW INDICATOR

BACKGROUND OF THE INVENTION

This invention generally relates to a fluid flow indicator and, more particularly, to a compact apparatus capable of handling both high and low flow rates.

Fluid flow indicators have been known and used for many years. Conventional flow indicators have utilized a single ball which rotates in a track. The single ball tends to restrict the flow creating an undesirable pressure drop across the indicator, and the indicators are typically not sensitive to low flow rates, for example, less than 5 to 6 gallons per minute. The indicators of this type that are used in industrial applications involving high flow rates are usually made of a metal and are therefore relatively expensive. A further disadvantage to these metal flow indicators is that the indicator is visible from only a very limited angle.

Alternative flow indicators utilize a flutter-type device such as a vane, propeller or flexible fibers instead of a single ball. The flutter-type devices are more sensitive to low flows than the single ball devices but, at very low flow rates, the absence of flutter may erroneously indicate that no flow exists. Other disadvantages to the flutter-type devices are that they always involve a hinged member or pivot which can jam or wear, or they involve flexible fibers which can become immobilized due to tangled fibers or dried-on fluids and can operate in only a limited number of positions. Their use is therefore limited more to laboratory applications than high flow rate industrial situations. In addition the flutter-type devices often involve molding of custom parts.

SUMMARY OF THE INVENTION

It is therefore an object of the invention to provide a fluid flow indicator that can operate effectively with high flow rates and without significant pressure drop and that is sensitive to low flow rates as well.

Another object of the invention is to provide an inexpensive flow indicator that can be adapted to any pipe size without precision machining or molding of custom parts and that can operate in any position.

A third object of the invention is to provide an inexpensive, durable, transparent indicator that is visible from any angle.

According to the present invention the improved fluid flow indicator includes (a) a transparent housing having an inlet, an outlet and a longitudinal passageway for conveying fluids through the housing; (b) a flow guide to create a transverse component in the flow of fluid through the housing, mounted within the longitudinal passageway of the housing and located adjacent the inlet; (c) two balls retained within the housing between the flow guide and the housing outlet and movable perpendicular to the housing's longitudinal axis in response to the transverse flow component created by the flow guide.

BRIEF DESCRIPTION OF THE DRAWINGS

The features of this invention which are believed to be novel are set forth with particularity in the appended claims. The invention itself, however, together with its objects and the advantages thereof, will be best understood by reference to the following description taken in connection with the accompanying drawings, in which:

DESCRIPTION OF THE PREFERRED EMBODIMENT

Figure 1:
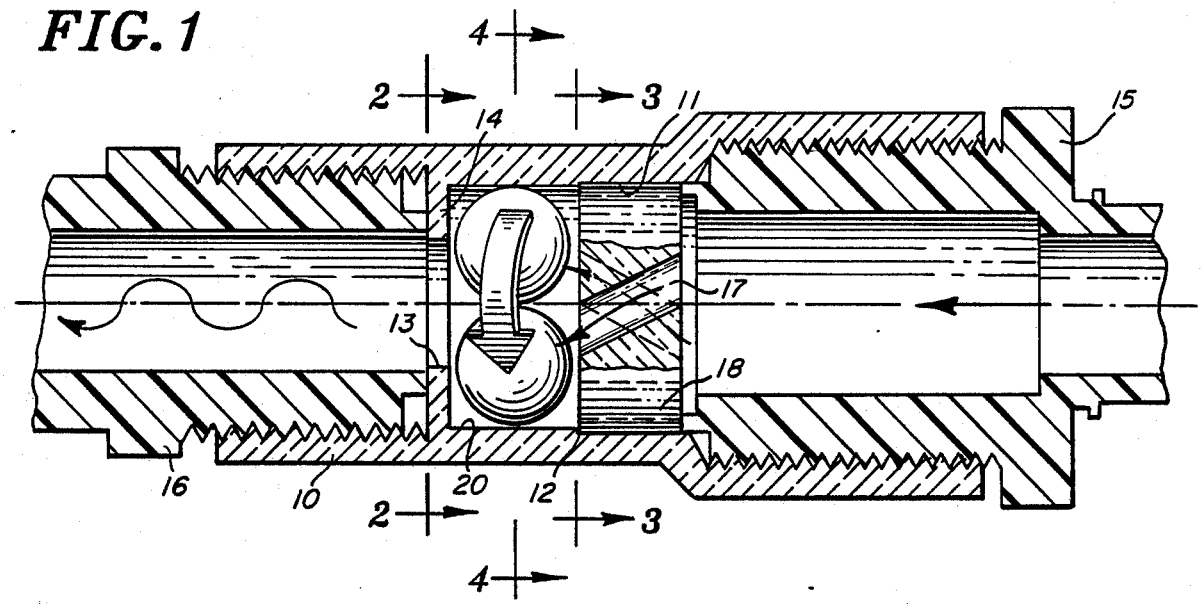
FIG. 1 is a longitudinal cross section through the fluid flow indicator with internal components broken away to show greater detail.
Figure 2:
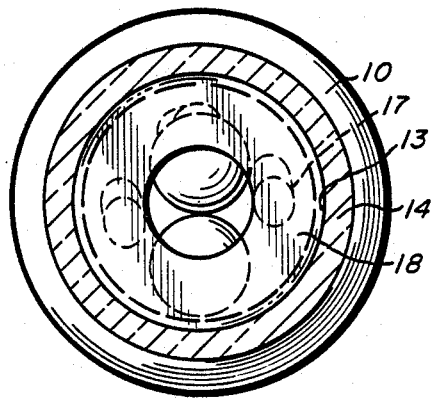
FIG. 2 is a section through the fluid flow indicator taken along line 2—2 of FIG. 1.
Figure 3:
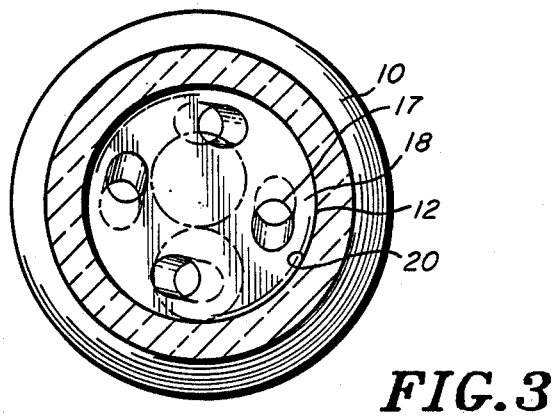
FIG. 3 is a cross section through the fluid flow indicator taken along line 3—3 of FIG. 1.
Figure 6:
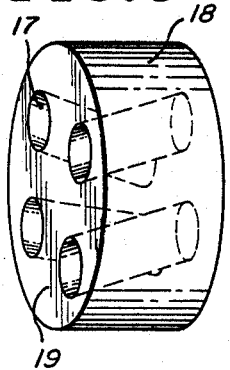
FIG. 6 is a perspective view of the tangential flow guide.
Figure 4:
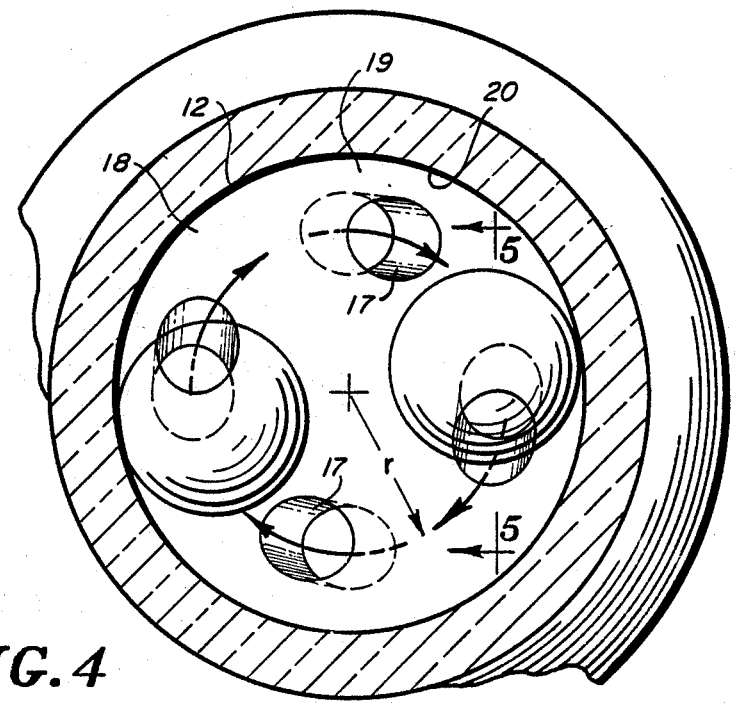
FIG. 4 is a cross section through the fluid flow indicator taken along line 4—4 of FIG. 1.

Referring now to the drawings, and particularly FIGS. 1, 4 and 6, the housing 10 of the fluid flow indicator is manufactured from any one of a variety of transparent materials. The housing has a longitudinal passageway 11 with at least one variation in the bore's diameter forming a stop 12 and a defined outlet port 13. At each end of the longitudinal passageway is a means for connecting inlet and outlet fittings 15 and 16 respectively. In the preferred embodiment, the housing is formed from a tapped plastic tube or machined from rod stock and conduit fittings are used for the inlet and outlet fittings. The outlet port is formed by a flange 14. The outlet port has substantially the same inside diameter as the inlet of the inlet fitting. All external edges of the housing are given a 45° chamfer to reduce stress cracking of the housing.

Figure 5:
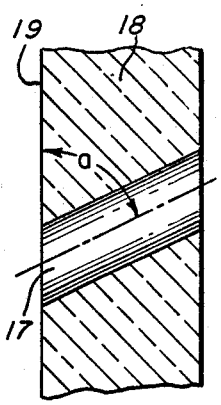
FIG. 5 is a partial cross section taken along line 5—5 of FIG. 4 and showing one of the flow passages of the tangential flow guide.

A tangential flow guide is formed by boring or molding a series of flow passages 17 in an annular pattern on a disc 18. The flow passages are positioned at an oblique angle a (see FIG. 5) to the surface of the disc 19 in order to impart a circumferential or transverse component to the axial fluid flow through the flow indicator. The combined cross sectional area of the flow passages should be as large as possible while imparting a transverse component to the fluid flow. The flow guide is mounted, preferably press fitted, into the longitudinal passageway 11 of the housing against the stop 12.

In the preferred embodiment, the diameter of the disc 18 forming the tangential flow guide is about twice the diameter of the outlet port 13. Four flow passages 17 are molded or otherwise formed in the disc, each flow passage being at a 60° angle to the surface of the disc 19. The annular radius r (see FIG. 4) is approximately 60% of the radius of the disc and the radius of each flow passage is approximately 25% of the radius of the disc. The cross sectional area of each flow passage is approximately 15–20% of the area of outlet port. Constructing the four flow passages in this manner provides a uniform flow while maximizing the transverse or circumferential component of the flow and minimizing pressure drop across the flow guide.

Two balls 19 are loosely retained or trapped within the housing's longitudinal passageway between the flow guide and the outlet port. The balls are retained in a track 20 which is perpendicular to the longitudinal axis of the passageway 11. The outlet port's diameter is as large as possible yet small enough to prevent the balls from being flushed out of the flow indicator by the fluids. The center of each ball is off center from the outlet port's center. These relationships reduce flow restriction as well as prevent the balls from being flushed out of the flow indicator by the fluids.

The transverse or circumferential component of the fluid flow acts on the balls to make them spin circumferentially. Since the preferred embodiment imparts a substantial transverse or circumferential component to the axial fluid flow through the flow indicator, the balls will spin within the track 20 about the passageway's longitudinal axis under very low flows as well as under maximum flow. If one of the balls is white and the other colored, the relative flow rate can be determined by counting the revolutions per unit time of one ball during low flows and by noting changes in the shade of color seen as the balls spin at high flows.

The novel features characteristic of this invention are set forth in the appended claims. While the invention is susceptible to various modifications and alternative constructions, a certain illustrated embodiment thereof has been shown in the drawings and described above in detail. Various changes and modifications to the preferred embodiments described herein will be apparent to those skilled in the art; for example, using clamps or glues instead of threads as the means for connecting the inlet and outlet fittings to the housing, substituting a grate-like structure for the flange forming the outlet port, or using flutes or veins molded into the wall upstream of the balls as an alternative structure to the tangential flow guide. It should be understood, however, that there is no intention to limit the invention to the specific form disclosed, but on the contrary, the intention is to cover all modifications, alternatives constructions and equivalents falling within the spirit and scope of the invention.

What is claimed is:

1. An apparatus for visually indicating fluid flow comprising:
   (a) a transparent housing defining a generally longitudinal main passageway for conveying fluids through said housing;
   (b) said housing having an inlet and an outlet;
   (c) means positioned adjacent to said inlet for creating in said fluid passing through said housing a flow component which is transverse to the longitudinal axis of said housing;
   (d) at least two generally spherical flow indicators positioned within said housing downstream of said transverse flow creating means; and
   (e) said outlet including an abutment extending radially inward to retain said spherical flow indicator within said housing.

2. The flow indicating apparatus recited in claim 1, wherein said transverse flow creating means comprises obliquely oriented flow passages.

3. The flow indicating apparatus recited in claim 2, wherein said outlet and transverse flow creating means define a track perpendicular to the longitudinal axis of said housing and slightly wider than the diameter of said spherical flow indicators, wherein said spherical flow indicators move in substantially circumferential path transverse to said housing's longitudinal axis.

4. The flow indicating apparatus recited in claim 3, wherein said abutment comprises an annular flange which defines an outlet port.

5. An apparatus for visually indicating fluid flow comprising:
   (a) a transparent housing defining a generally longitudinal main passageway for conveying fluids through said housing;
   (b) said housing having an inlet and an outlet;
   (c) means positioned adjacent to said inlet for creating in said fluid passing through said housing a flow component which is transverse to the longitudinal axis of said housing;
   (d) at least two generally spherical flow indicators positioned within said housing downstream of said transverse flow creating means;
   (e) said outlet including abutments extending radially inward to retain said spherical flow indicator within said housing; and
   (f) said transverse flow creating means comprising obliquely oriented flow passages.

6. An apparatus for visually indicating fluid flow comprising:
   (a) a transparent housing defining a generally longitudinal main passageway for conveying fluids through said housing;
   (b) said housing having an inlet and an outlet;
   (c) means positioned adjacent to said inlet for creating in said fluid passing through said housing a flow component which is transverse to said housing's longitudinal axis;
   (d) at least one generally spherical flow indicator positioned within said housing downstream of said transverse flow creating means;
   (e) said outlet including an abutment extending radially inward to retain said spherical flow indicator within said housing; and
   (f) said transverse flow creating means and said abutment being spaced to define there between a track in which said fluid flow indicator moves in substantially circumferential path transverse to said housing's longitudinal axis.

* * * * *